United States Patent [19]

Veltman

[11] Patent Number: 5,752,599

[45] Date of Patent: May 19, 1998

[54] SMOKELESS TOBACCO CAN HOLDER

[75] Inventor: Stephen J. Veltman, 3773 Timberglen, #1313, Dallas, Tex. 75287

[73] Assignee: Stephen J. Veltman, Richardson, Tex.

[21] Appl. No.: 560,303

[22] Filed: Feb. 10, 1996

[51] Int. Cl.[6] .................................................. B60R 11/00
[52] U.S. Cl. .................. 206/236; 206/242; 131/260; 248/152; 248/346.5
[58] Field of Search ................... 206/256, 242, 206/236, 443, 581, 241; 131/184.1, 184.3, 243, 260, 350; 248/146, 152, 176.1, 177.1, 346.01, 346.11, 346.5, 310, 362; 132/291, 301, 316

[56] References Cited

U.S. PATENT DOCUMENTS

| | | |
|---|---|---|
| 498,695 | 5/1893 | Powell . |
| 573,240 | 12/1896 | Savage et al. ............... 132/291 |
| 850,404 | 4/1907 | Shields ....................... 131/184.3 |
| 1,015,830 | 1/1912 | Penney . |
| 1,385,288 | 7/1921 | Walker . |
| 1,490,845 | 4/1924 | Music ........................... 206/385 |
| 2,092,219 | 9/1937 | Knox . |
| 2,599,868 | 6/1952 | Schuh . |
| 2,611,480 | 9/1952 | Lavanish . |
| 2,650,597 | 9/1953 | Girard .......................... 206/385 |
| 3,356,208 | 12/1967 | Kondo . |
| 4,562,923 | 1/1986 | Katada et al. ............... 132/316 |
| 4,829,618 | 5/1989 | McKee ...................... 248/346.11 |
| 5,465,891 | 11/1995 | Bridges .................... 248/346.11 |

Primary Examiner—Paul T. Sewell
Assistant Examiner—Luan K. Bui
Attorney, Agent, or Firm—David H. Judson; Benjamin C. Huang

[57] ABSTRACT

A can holder for use with a can of smokeless tobacco is disclosed. The apparatus comprises a threaded container for receiving and securing a can of smokeless tobacco. A mirror is connected to the underside of the container to assist a smokeless tobacco user in determining whether or not tobacco particles have become lodged or are adhering to their teeth. A toothpick removably retained within a toothpick housing assists a smokeless tobacco user in removing any detected tobacco particles.

12 Claims, 2 Drawing Sheets

SMOKELESS TOBACCO CAN HOLDER

TECHNICAL FIELD

The present invention relates to smokeless tobacco accessories, and more particularly to smokeless tobacco can holders.

BACKGROUND OF THE INVENTION

The widespread use of smokeless tobacco products has become prevalent around the world. Most smokeless tobacco products are sold in circular cardboard and metal or molded plastic cans having a paper seal enclosing them. This particular form of tobacco is normally referred to as snuff or finecut moist smokeless tobacco. When a user desires to use the product, the paper seal is broken, the top of the can removed, and the desired amount of smokeless tobacco removed for enjoyment. The lid is then replaced on the can until further use is desired.

Normally a pinch or dip of smokeless tobacco is placed between the lip and gum of a user. However, upon placement or removal of the smokeless tobacco between the lip and gums, tobacco particles may become lodged or located on the teeth and gums of the user. This creates an unattractive appearance which the smokeless tobacco user does not desire. Thus, the user is required to use any handy means for removing granules from the teeth, such as a tongue, traditional toothpick, or any other article that might be handy. Furthermore, the user will have difficulty determining whether or not the tobacco particles have been completely removed from their teeth since they are not able to see directly into their own mouth. Thus, they must consult another individual or search for the mirror to look for stray tobacco particles. Therefore, a need has arisen for a smokeless tobacco can holder that assists the user in maintaining a high level oral hygiene but is easy to use and carry in conjunction with a can of smokeless tobacco.

SUMMARY OF THE INVENTION

The present invention overcomes the foregoing and other problems with a smokeless tobacco can holder. The can holder of the present invention include a base and wall portions defining a chamber for receiving and holding a can of smokeless tobacco. The bottom side of the can holder includes a mirror providing a smokeless tobacco user with an easy method of determining whether or not the tobacco particles have lodged or adhered to their teeth. A toothpick releasably locks into the base of the can holder. The toothpick enables a user to clean tobacco particles from their teeth in conjunction with the mirror. A can opener portion may be added to the toothpick enabling a user to break the paper seal of an unopened can of smokeless tobacco. When the combination of toothpick and can opening device are not being used, the toothpick is inserted into the base of the can holder wherein the toothpick is retained until further use is required.

The foregoing outlines some of the more pertinent aspects of the present invention. These aspects should be construed to be merely illustrative of some of the more prominent features and applications of the invention. Many other beneficial results can be obtained by applying the disclosed invention in a different manner or modify the invention as will be described. Accordingly, other aspects and a fuller understanding of the invention may be had by referring to the following detailed description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
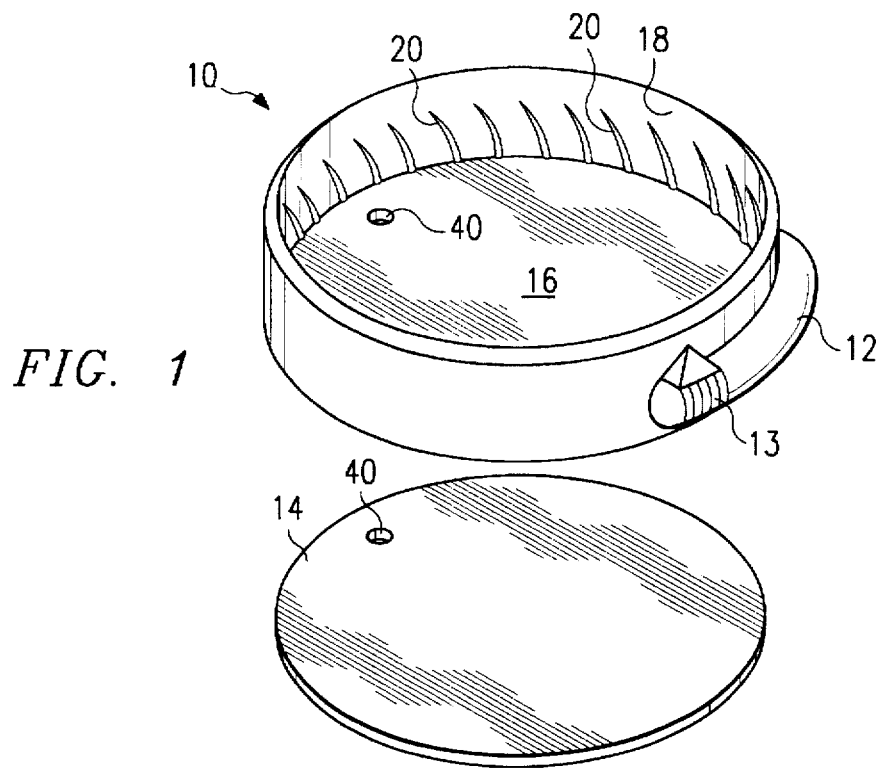
FIG. 1 is an exploded perspective view of the smokeless tobacco can holder of the present invention.

Referring now to the drawings and more particularly to FIG. 1, there is illustrated a perspective view of the smokeless tobacco can holder of the present invention. The device consists of the can holder 10, toothpick housing 12, toothpick and can opener device 13 and oral mirror 14.

The can holder 10 has a base portion 16 and sidewall 18 forming a containing area for a can of smokeless tobacco. The base 16 comprises a circular, planar surface on which the bottom side of a can of smokeless tobacco will rest. The sidewall 18 extends upward from the peripheral edges of the base 16 to such a height as to contain a can of smokeless tobacco while still providing access to the lid of the can of smokeless tobacco. On the interior side of sidewall 18 are raised threads 20 to secure a can of smokeless tobacco within the can holder 10. A can of smokeless tobacco is inserted within the can holder 10 by placing it in the cavity defined by the base 16 and sidewall 18 and twisting the can in a counter clockwise direction such that the threads 20 are embedded into the cardboard surface of a can of smokeless tobacco.

Figure 2:
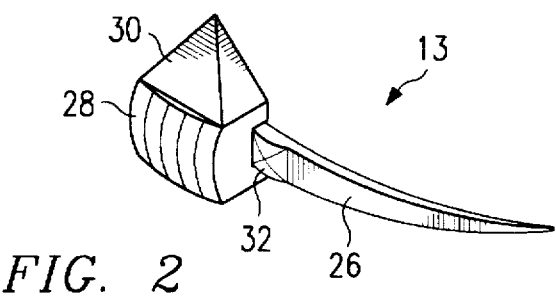
FIG. 2 is a perspective view of the combination toothpick and can opener.
Figure 3:
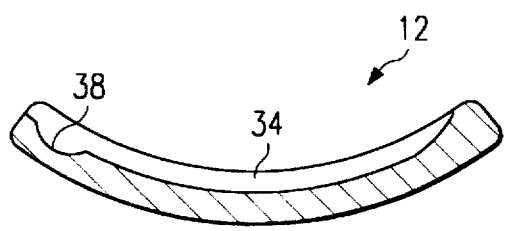
FIG. 3 is a cross-sectional view of the toothpick housing of the smokeless tobacco can holder.

Referring now also to FIGS. 2 and 3, there is illustrated the toothpick and can opener device 13 and the toothpick housing 12. The toothpick and can opening device 13 consists of a flexible toothpick portion 26 enabling a user to clean tobacco particles from their teeth. The can opener portion 28 connects to one end of the flexible toothpick portion 26 and acts as a handle for the toothpick portion. The can opener portion 28 defines a bladed edge 30 for breaking the paper seal on an unopened can of smokeless tobacco. The bladed edge 30 is inserted through a paper seal and then drawn around the seal to open a can of smokeless tobacco. The flexible toothpick portion 26 also includes a raised knob 32 to enable the toothpick 26 to be releasably locked within the toothpick housing 12.

The toothpick housing 12 follows the contour of the exterior surface of sidewall 18. The toothpick housing 12 defines a toothpick chamber 34 for receiving the flexible toothpick portion 26. The toothpick housing 12 also defines a notch 38 for receiving the raised knob 32 of the flexible toothpick portion 26. The raised knob 32 will snap into and out of the notch 38 such that when the flexible toothpick portion 26 is placed within the toothpick housing 12, the toothpick and can opener device 13 is securely maintained in the toothpick housing 12. A pulling force applied to the handle 28 enables removal of the toothpick and can opener device 13 from the housing 12.

The oral mirror 14 is connected to the bottom side of base 16 and covers substantially the entire surface thereof. The oral mirror 14 is connected by means of an adhesive or any other comparable means. The mirror 14 and base 16 may include pressure release holes 40 to assist in removing the mirror from the can holder 10.

Figure 4A:
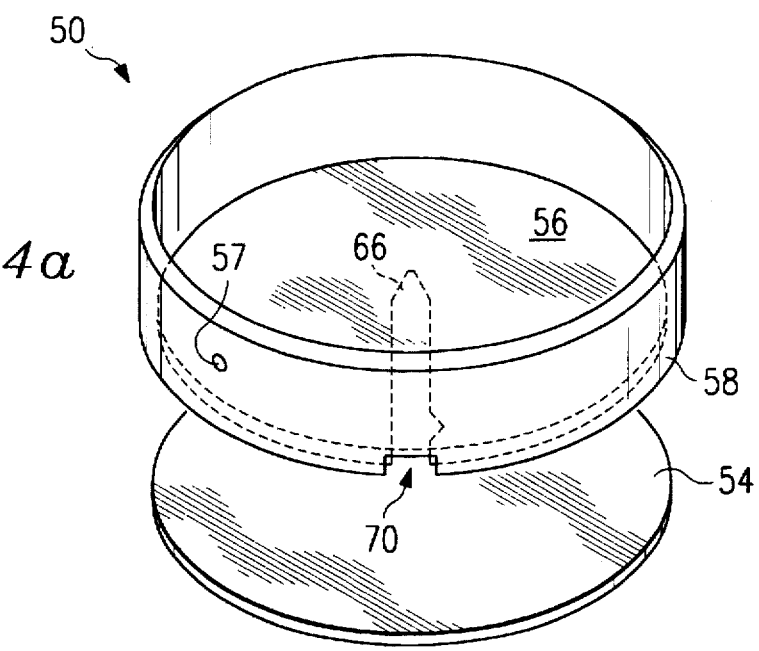
FIGS. 4a and 4b are perspective views of an alternative embodiment of a smokeless tobacco can holder.
Figure 4B:
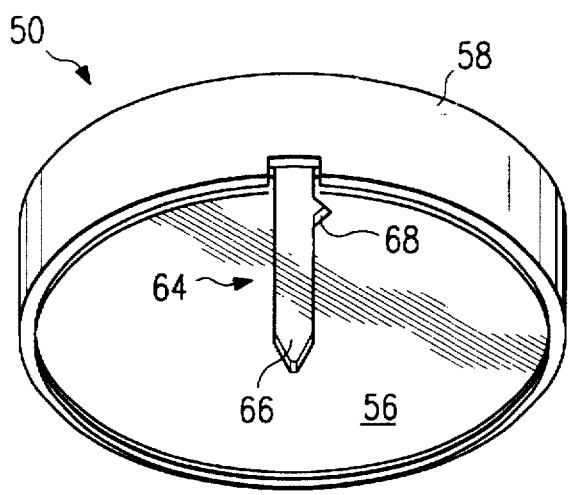
Figure 5:
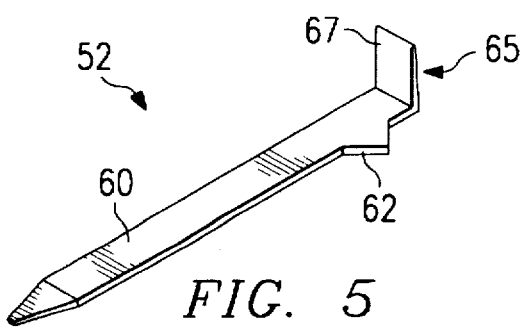
FIG. 5 is a perspective view of a reusable toothpick.

Referring now to FIGS. 4a, 4b and 5, there is illustrated another embodiment of the smokeless tobacco can holder of the present invention. The device consists of the can holder 50, reusable toothpick 52 and mirror 54.

The can holder 50 has a base portion 56 and sidewall 58 forming a containing area for a can of smokeless tobacco. In this embodiment, the base 56 comprises a circular, planar surface on which the bottom side of a can of smokeless tobacco will rest. The sidewall 58 extends upward from the peripheral edges of the base 56 to such a height as to contain a can of smokeless tobacco while still providing access to the lid of the can of smokeless tobacco. The sidewall 58 defines at least one hole 57 slightly above the base 56 to prevent vacuum pressure from making removal of a can of tobacco more difficult. The base 56 and sidewall 58 are preferable made of polyurethane having a slight amount of stretching properties to enable cans of slightly differing sizes to be placed in the can holder 50. The sidewall 58 also extends slightly downward from the base 56 to define a shallow chamber for receiving the mirror 54.

The reusable toothpick 52 consists of a flexible toothpick blade 60 enabling a user to clean tobacco particles from their teeth. The flexible toothpick blade 60 also includes a raised knob 62 to enable the toothpick 52 to be releasably locked within the toothpick housing 64. A handle 65 including a raised lip 67 enables the toothpick 52 to be easily held. The raised lip 67 allows the reusable toothpick 52 to be easily removed from toothpick housing 64 as will be more fully discussed in a moment.

The toothpick housing 64 comprises a chamber 66 on the bottom side 68 of base 56 and above mirror 54 for receiving the flexible toothpick blade 60. The chamber 66 also defines a notch 68 for receiving the raised knob 62 of the flexible toothpick blade 60. The raised knob 62 will snap into and out of notch 68 such that when the flexible toothpick blade 60 is placed within the toothpick housing 64, the toothpick 52 is securely maintained in the toothpick housing 64. A pulling force applied to the handle 65 enables removal of the toothpick 52 from the housing 64. The handle 64 rests within an opening 70 in sidewall 58 with the raised lip 67 extending slightly beyond the sidewall 58 to enable easy withdrawal of the reusable toothpick 52 from the toothpick housing 64.

The mirror 54 is connected to the bottom side of base 56 and covers substantially the entire surface thereof. The mirror 54 is connected by means of an adhesive or any other comparable means. The mirror 54 encloses the chamber 66 to provide the toothpick housing 64.

It should be appreciated by those skilled in the art that the specific embodiments disclosed above may be readily utilized as a basis for modifying or designing other structures for carrying out the purposes of the present invention. It should also be realized by those skilled in the art that such structures do not depart from the spirit and scope of the invention as set forth in the appended claims.

I claim:

1. A smokeless tobacco can holder, comprising:

a circular base having a top side, a bottom side and an edge around the circumference of the base;

a wall extending upwards from the edge of the base such that the top side of the base and an inner side of the wall form an enclosure for receiving a can of smokeless tobacco, wherein the inner side of the wall includes lock-in threads for securing the can of smokeless tobacco to the can holder;

a mirror attached to the bottom side of the base; and detachable means for cleaning a user's teeth and breaking a seal of the can of smokeless tobacco, wherein the detachable means for cleaning and breaking includes:

a flexible toothpick;

an opener connected to one end of the toothpick, the opener having an edge for breaking the seal of the can of smokeless tobacco; and a toothpick housing connected to the smokeless tobacco can holder, the housing defining a chamber for receiving and retaining the flexible toothpick.

2. The smokeless tobacco can holder of claim 1 wherein the toothpick housing is formed in the base.

3. The smokeless tobacco can holder of claim 1 wherein the toothpick housing connects to an outer side of the wall.

4. The smokeless tobacco can holder of claim 1 further including:

a raised knob on the flexible toothpick; and a notch within the chamber of the toothpick housing for receiving the raised knob in the flexible toothpick to secure the toothpick within the toothpick housing.

5. A smokeless tobacco can holder, comprising:

a resuable toothpick;

a circular base having a top side, a bottom side, and a peripheral edge, the base defining a chamber for releasably receiving and retaining the reusable toothpick on the bottom side;

a wall extending upwards from the peripheral edge of the base such that the top side of the base and an inner side of the wall form an enclosure for receiving a can of smokeless tobacco;

a raised knob on the reusable toothpick; and a notch within the chamber for receiving the raised knob of the reusable toothpick to secure the toothpick within the chamber.

6. The smokeless tobacco can holder of claim 5 wherein the inner side of the wall includes lock-in threads for securing the can of smokeless tobacco to the can holder.

7. The smokeless tobacco can holder of claim 1 further including a mirror attached to the bottom side of the base.

8. The smokeless tobacco can holder of claim 1 wherein the circular base and wall are made from polyurethane.

9. A smokeless tobacco can holder, comprising:

a circular base having a top side, a bottom side, and a peripheral edge;

a wall extending upwards from the peripheral edge of the base such that the top side of the base and an inner side of the wall form an enclosure for receiving a can of smokeless tobacco;

a reusable toothpick having a raised knob;

a toothpick housing incorporated into the can holder, the housing defining a chamber for removably receiving and retaining the reusable toothpick and a notch for receiving the raised knob to releasably lock the flexible toothpick within the interior chamber; and a mirror attached to the bottom side of the base.

10. The smokeless tobacco can holder of claim 9 wherein the inner side of the wall includes lock-in threads for securing the can of smokeless tobacco to the can holder.

11. The smokeless tobacco can holder of claim 9 further including pressure release holes in both the mirror and the base for assisting in removal of the mirror.

12. The smokeless tobacco can holder of claim 9 further including a smokeless tobacco can opener attached to the reusable toothpick.

* * * * *